US011914258B2

(12) United States Patent
Takimoto et al.

(10) Patent No.: US 11,914,258 B2
(45) Date of Patent: Feb. 27, 2024

(54) ELECTRONIC APPARATUS INCORPORATING A LIQUID CRYSTAL ELEMENT

(71) Applicant: Japan Display Inc., Tokyo (JP)

(72) Inventors: Akio Takimoto, Tokyo (JP); Toshiki Kaneko, Tokyo (JP); Takuo Kaitoh, Tokyo (JP); Kazuhiro Nishiyama, Tokyo (JP); Hiroyuki Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/148,072

(22) Filed: Dec. 29, 2022

(65) Prior Publication Data

US 2023/0137206 A1    May 4, 2023

Related U.S. Application Data

(63) Continuation of application No. 17/126,475, filed on Dec. 18, 2020, now Pat. No. 11,599,001, which is a
(Continued)

(30) Foreign Application Priority Data

Jun. 28, 2018 (JP) .................................. 2018-123159

(51) Int. Cl.
*G09G 3/36* (2006.01)
*G02F 1/137* (2006.01)
(Continued)

(52) U.S. Cl.
CPC ........... *G02F 1/137* (2013.01); *G02B 6/0055* (2013.01); *G02F 1/133528* (2013.01);
(Continued)

(58) Field of Classification Search
CPC ............... G02F 1/137; G02F 1/133528; G02F 1/133322; G02F 1/133314; G02F 1/1343;
(Continued)

(56) References Cited

U.S. PATENT DOCUMENTS

2006/0066783 A1     3/2006 Sampsell
2011/0310290 A1*  12/2011 Oouchida .............. G01C 3/085
                                                                   348/E5.045
(Continued)

FOREIGN PATENT DOCUMENTS

JP           9-80581 A       3/1997
JP       2014-211573 A      11/2014
(Continued)

OTHER PUBLICATIONS ffice Action dated Feb. 9, 2023, in corresponding Chinese Application No. 201980042873.X; 8 pages.
(Continued)

*Primary Examiner* — Pegeman Karimi
(74) *Attorney, Agent, or Firm* — Maier & Maier, PLLC

(57) ABSTRACT

According to one embodiment, an electronic apparatus includes a camera, a first polarizer, a second polarizer, a liquid crystal panel, and a controller controlling the liquid crystal panel. The liquid crystal panel includes a first region and a second region. The controller controls a first opening mode of transmitting light through the first region and the second region, and a second opening mode of making a quantity of light transmitted through the first region smaller than a quantity of light transmitted through the second region.

1 Claim, 15 Drawing Sheets

Related U.S. Application Data continuation of application No. PCT/JP2019/020783, filed on May 24, 2019.

(51) Int. Cl.
*F21V 8/00* (2006.01)
*G02F 1/1335* (2006.01)
*H04N 23/57* (2023.01)

(52) U.S. Cl.
CPC ............... *G09G 3/36* (2013.01); *H04N 23/57* (2023.01); *G09G 2360/145* (2013.01)

(58) Field of Classification Search
CPC .. G02B 6/0055; G09G 3/36; G09G 2360/145; H04N 23/57; G03B 9/02; G03B 11/00
See application file for complete search history.

(56) References Cited

U.S. PATENT DOCUMENTS

| | | | | |
|---|---|---|---|---|
| 2012/0195580 | A1* | 8/2012 | Itoh | G01C 3/08 396/111 |
| 2015/0084945 | A1* | 3/2015 | Kizu | G09G 3/003 345/212 |
| 2016/0161664 | A1 | 6/2016 | Ishida et al. | |
| 2017/0053592 | A1 | 2/2017 | Shin et al. | |
| 2019/0377222 | A1* | 12/2019 | Smith | G02F 1/137 |
| 2020/0014780 | A1 | 1/2020 | Jones | |
| 2021/0232249 | A1 | 7/2021 | Evans, V et al. | |

FOREIGN PATENT DOCUMENTS

| | | |
|---|---|---|
| JP | 2015-129869 A | 7/2015 |
| JP | 2017-040908 A | 2/2017 |
| WO | 2015022887 A1 | 2/2015 |
| WO | 2017075459 A1 | 5/2017 |

OTHER PUBLICATIONS

International Search Report dated Jul. 23, 2019 in PCT/JP2019/020783 filed May 24, 2019, 1 page.
English machine translation of Notice of Reasons for Refusal dated May 24, 2022 in Japanese Patent Application No. 2018-123159, 4 pages.

* cited by examiner

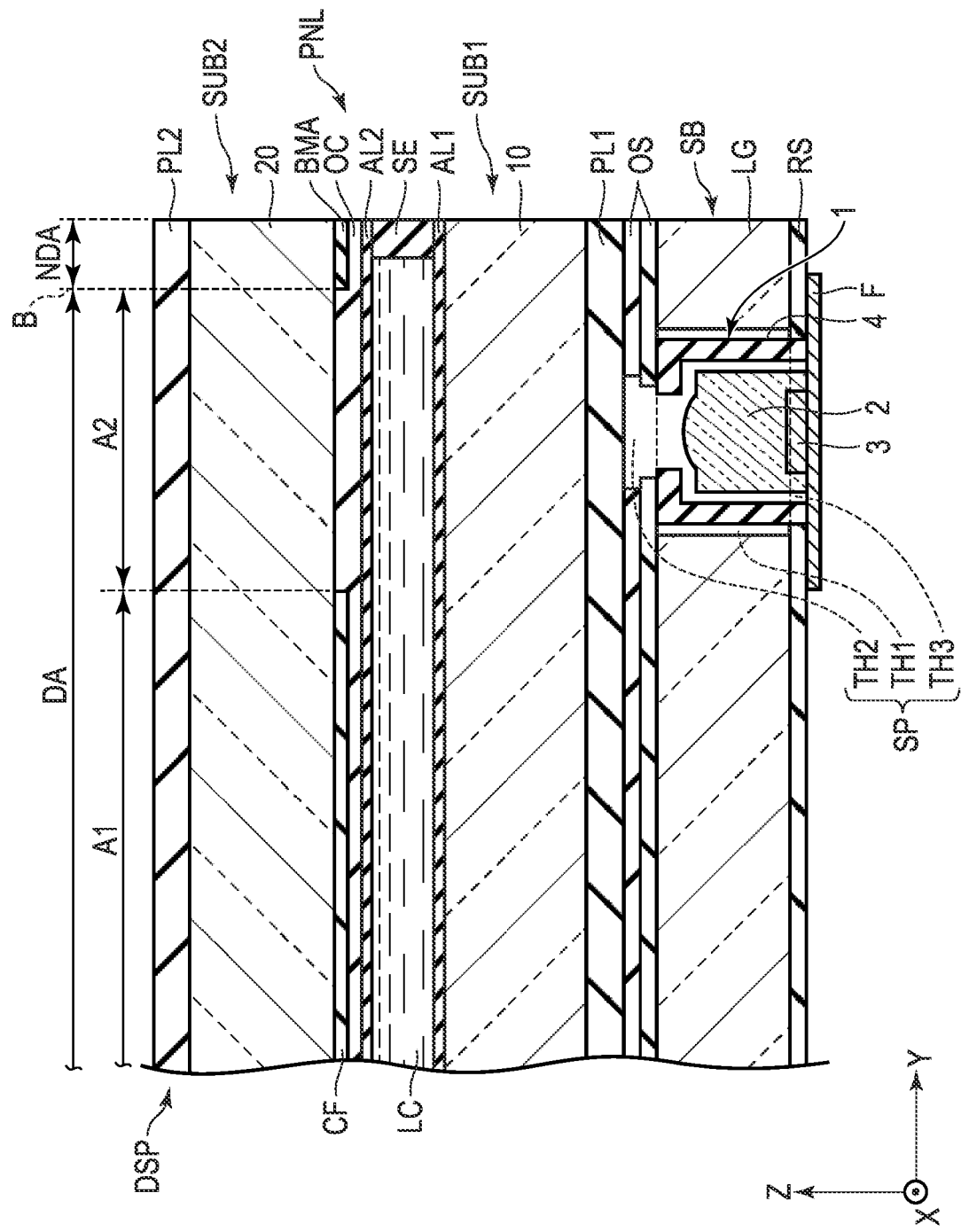
F I G. 2

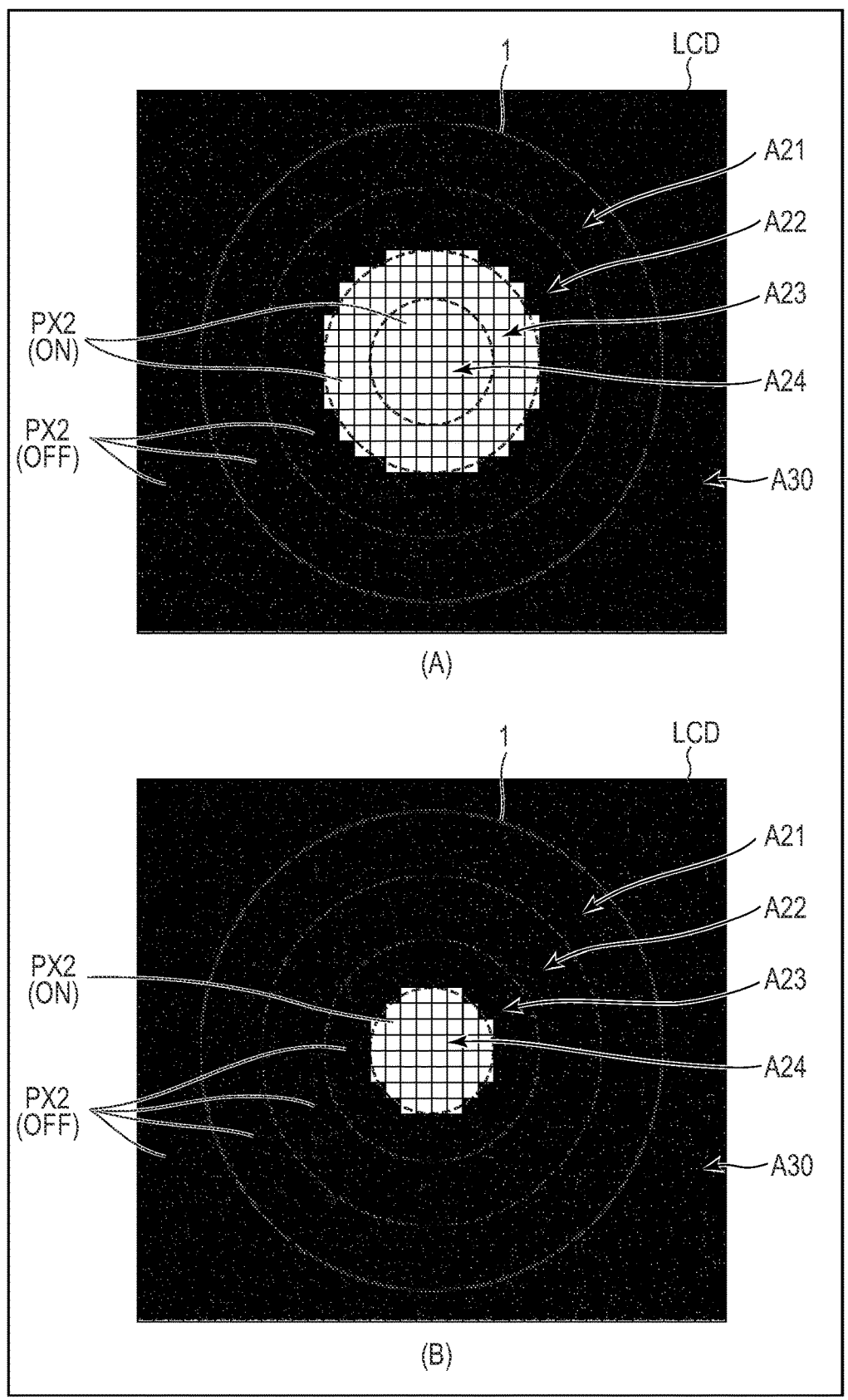
F I G. 9

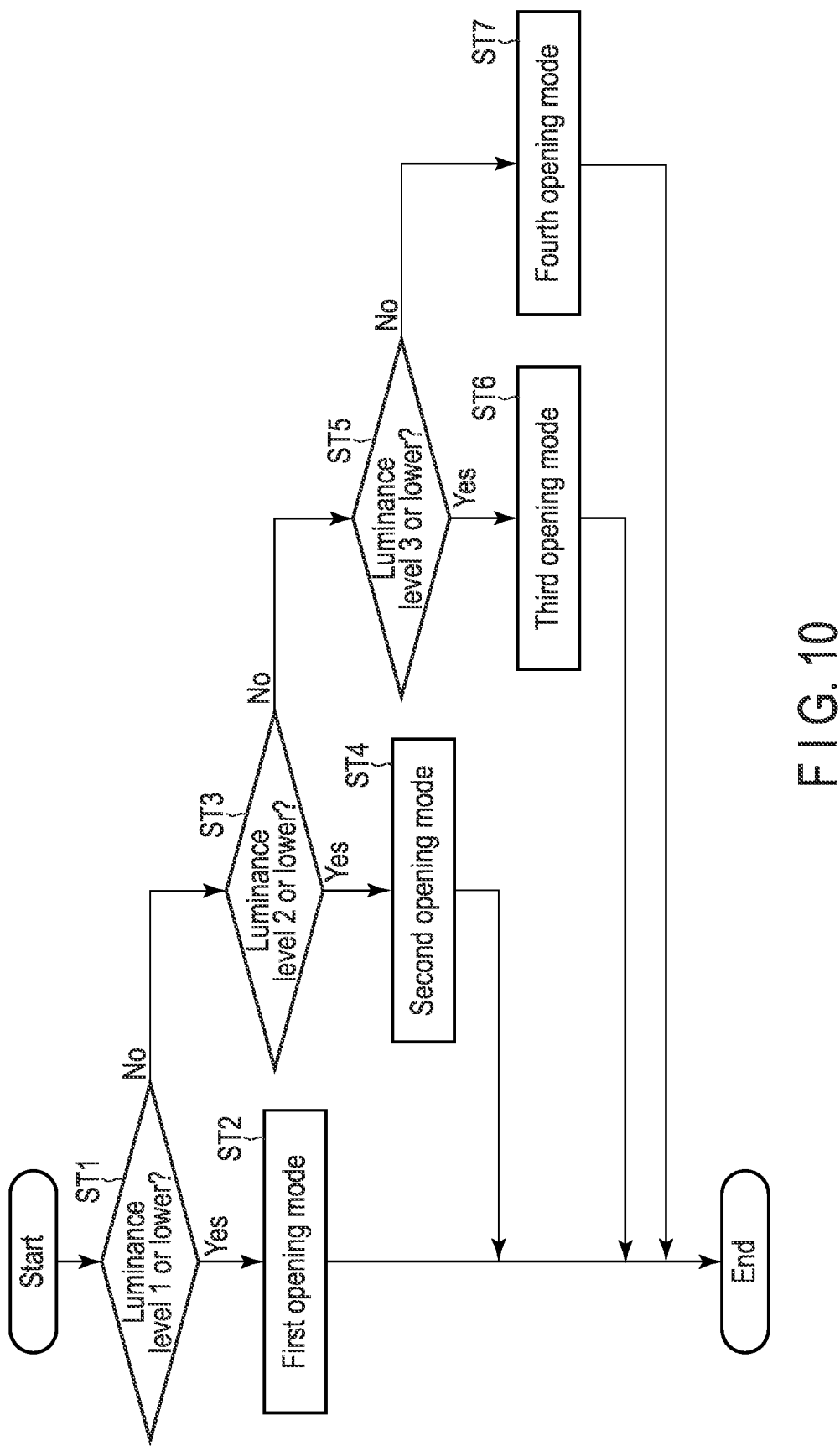
F I G. 10

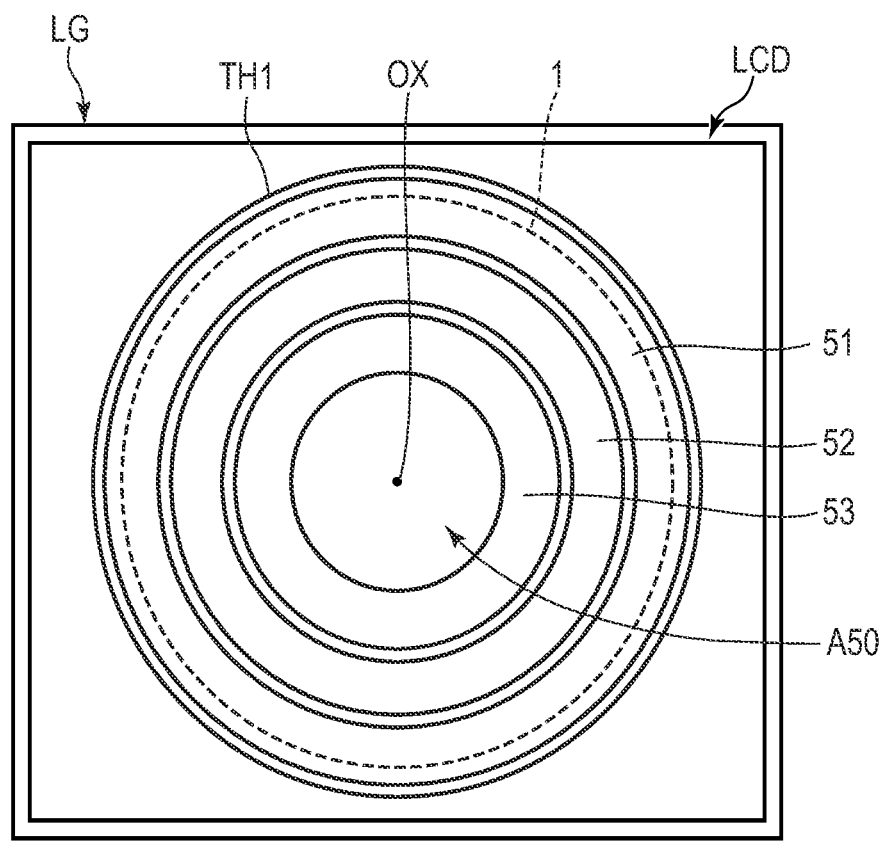
F I G. 11

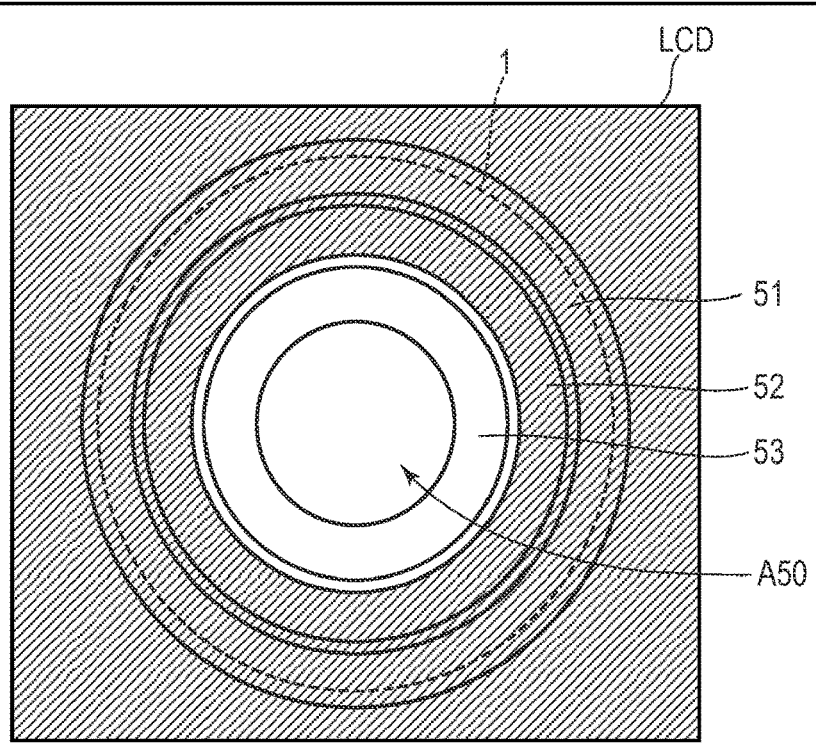
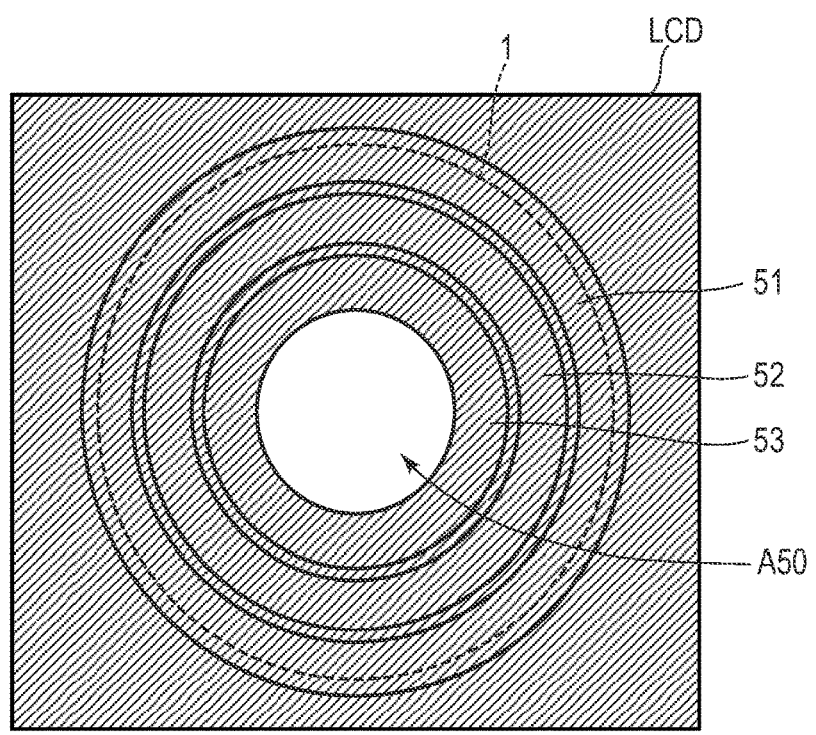
F I G. 14

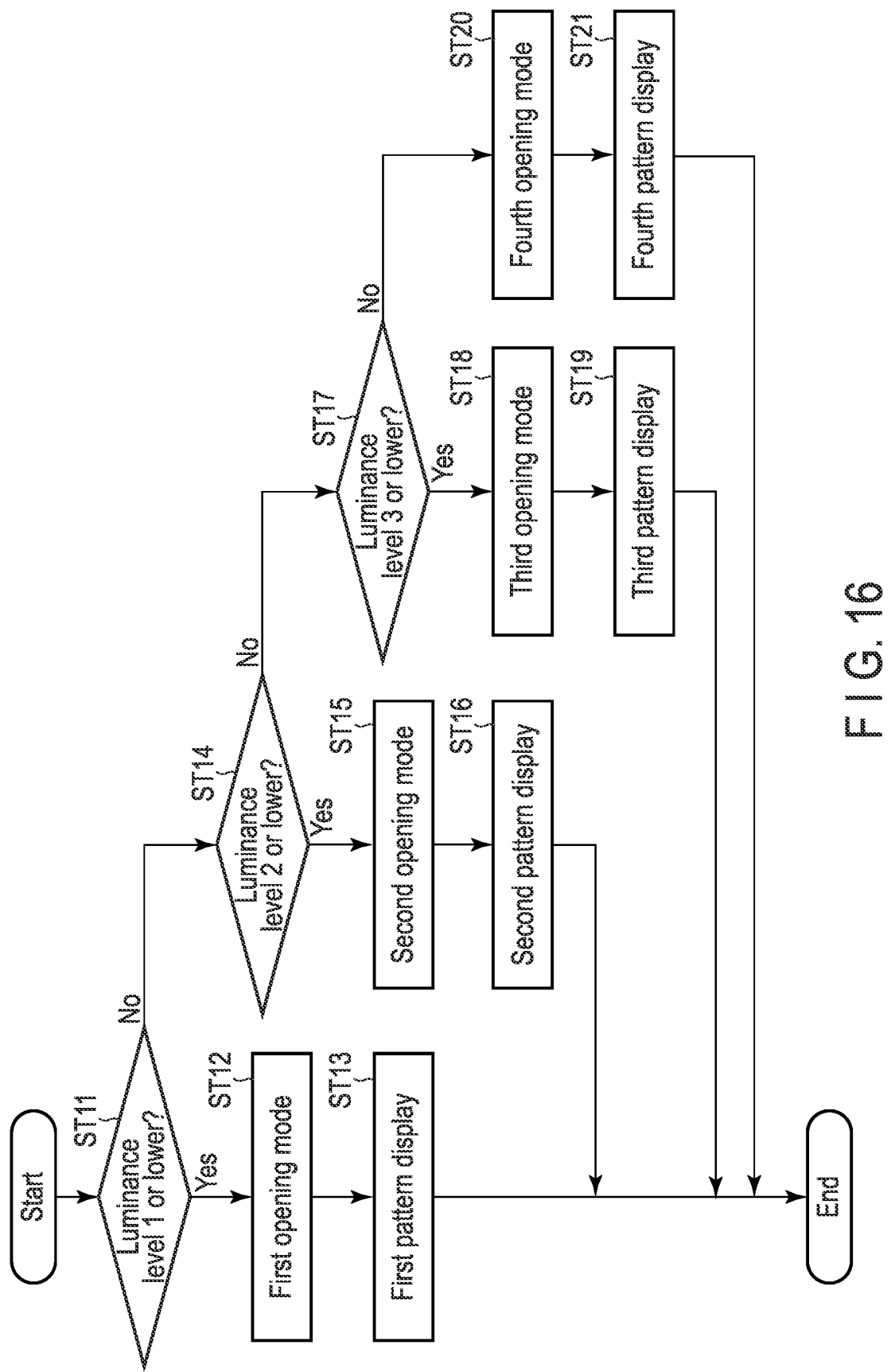
F I G. 16

ELECTRONIC APPARATUS INCORPORATING A LIQUID CRYSTAL ELEMENT

CROSS-REFERENCE TO RELATED APPLICATIONS

This application is a continuation of U.S. application Ser. No. 17/126,475, filed Dec. 18, 2020, which is a Continuation Application of PCT Application No. PCT/JP2019/020783, filed May 24, 2019 and based upon and claiming the benefit of priority from Japanese Patent Application No. 2018-123159, filed Jun. 28, 2018, the entire contents all of which are incorporated herein by reference.

FIELD

Embodiments described herein relate generally to a display device, an electronic apparatus incorporating the same, and a program.

BACKGROUND

Recently, electronic apparatuses such as a smartphone comprising a display portion and a camera on the same surface side have been widely put into practical use. In such an electronic apparatus, the camera is provided outside the display portion. Demands to reduce an outer frame width of the display portion while maintaining a space to install the camera have been increased.

In addition, capturing sharp pictures is desired.

BRIEF DESCRIPTION OF THE DRAWINGS

FIG. 2 is a cross-sectional view including the display device DSP and a camera 1 shown in FIG. 1.

FIG. 9 is a plan view showing another control example of the liquid crystal element LCD shown in FIG. 7.

FIG. 10 is a flowchart illustrating the control example of the liquid crystal element LCD of the embodiments.

FIG. 11 is a plan view showing another configuration example of the liquid crystal element LCD overlaid on the camera 1.

FIG. 14 is a plan view showing another control example of the liquid crystal element LCD shown in FIG. 11.

FIG. 16 is a flowchart illustrating the control example of the liquid crystal element LCD of the embodiments.

DETAILED DESCRIPTION

Figure 1:
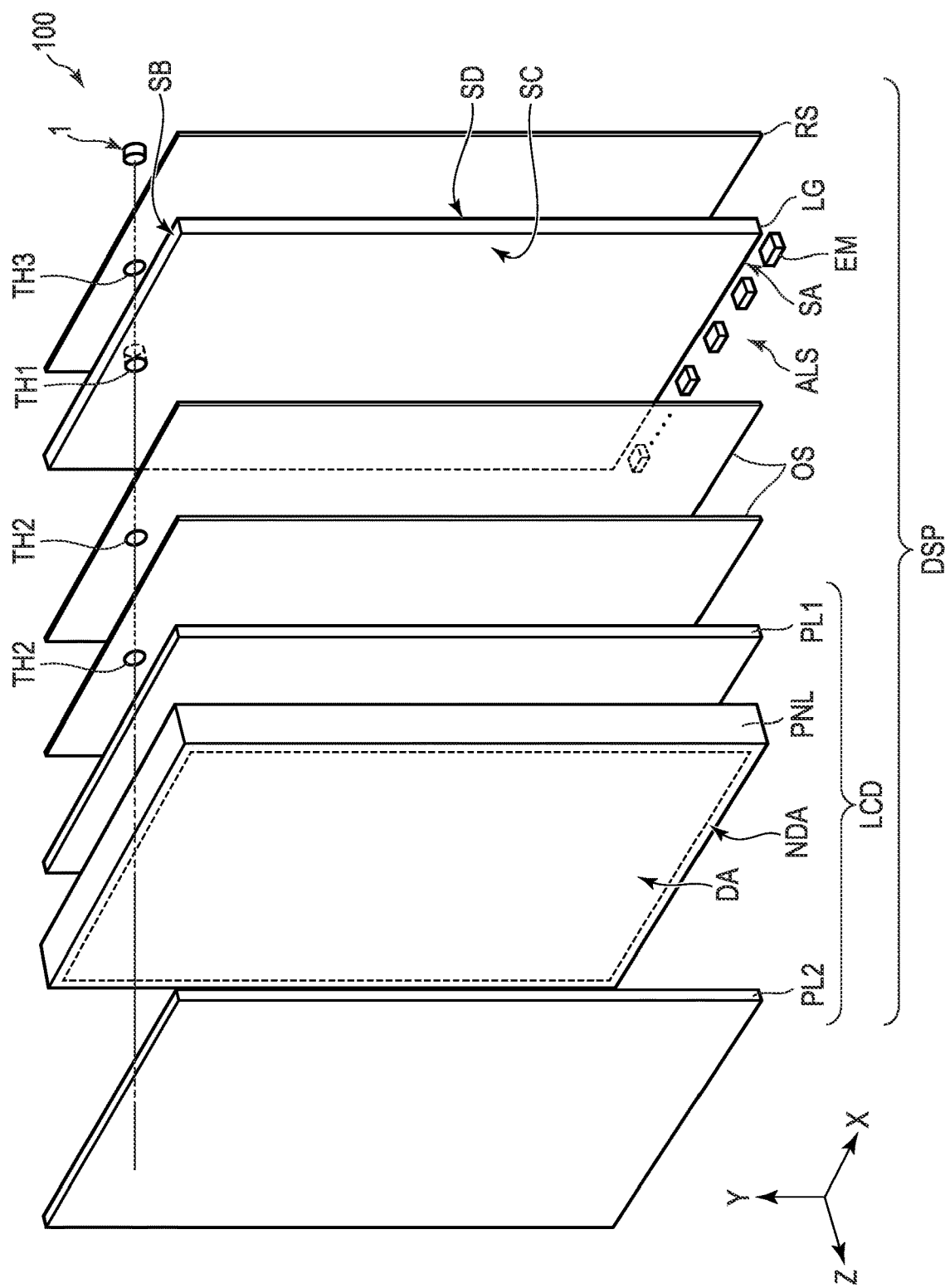
FIG. 1 is an exploded perspective view showing a configuration example of a display device DSP according to embodiments.

In general, according to one embodiment, there is provided an electronic apparatus comprising: a camera; a first polarizer; a second polarizer; a liquid crystal panel located between the first polarizer and the second polarizer; and a controller controlling the liquid crystal panel, the liquid crystal panel including first and second regions overlaid on the camera, the controller controlling a first opening mode of transmitting light through the first region and the second region, and a second opening mode of making a quantity of light through the first region smaller than a quantity of light transmitted through the second region.

According to another embodiment, there is provided a display device arranged in front of a camera, comprising: a first polarizer; a second polarizer; and a liquid crystal panel located between the first polarizer and the second polarizer, the liquid crystal panel including a first region and a second region which are overlaid on the camera, transmitting light through the first region and the second region in a first opening mode, and making a quantity of the light transmitted through in the first region smaller than a quantity of the light transmitted through the second region in a second opening mode.

According to another embodiment, there is provided a program urging a computer controlling a camera and liquid crystal element including a first region and a second region which are overlaid on the camera to implement a first opening mode of transmitting light through the first region and the second region and a second opening mode of making a quantity of the light transmitted through the first region smaller than a quantity of the light transmitted through the second region.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, and the like of the respective parts are illustrated schematically in the drawings, rather than as an accurate representation of what is implemented, but such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

FIG. 1 is an exploded perspective view showing a configuration example of a display device DSP according to the embodiments. For example, the first direction X, the second direction Y, and the third direction Z are orthogonal to each other but may intersect at an angle other than 90 degrees. The first direction X and the second direction Y correspond to the directions parallel to a main surface of a substrate which constitutes the display device DSP, and the third direction Z corresponds to the thickness direction of the display device DSP.

The display device DSP comprises a first polarizer PL1, a second polarizer PL2, a liquid crystal panel PNL, optical sheets OS, a light guide LG, light sources EM, and a reflective sheet RS. The reflective sheet RS, the light guide LG, the optical sheets OS, the first polarizer PL1, the liquid crystal panel PNL, and the second polarizer PL2 are arranged in this order in the third direction Z. A plurality of light sources EM are spaced apart and arranged in the first direction X. At least the light sources EM and the light guide LG constitute a planar light source ALS that illuminates the liquid crystal panel PNL. The planar light source ALS may further include the optical sheets OS and the reflective sheet RS. The first polarizer PL1, the second polarizer PL2, and the liquid crystal panel PNL constitute a liquid crystal element LCD comprising an optical switch function for the light traveling in the third direction Z. Such a liquid crystal element LCD exerts a function of transmitting or blocking the light in each region in the X-Y plane defined by the first direction X and the second direction Y.

An electronic apparatus 100 incorporating such a display device DSP comprises a camera 1.

The liquid crystal panel PNL is formed in a flat plate shape parallel to the X-Y plane. The liquid crystal panel PNL is located between the first polarizer PL1 and the second polarizer PL2. The liquid crystal panel PNL comprises a display portion DA which displays an image and a non-display portion NDA in a frame shape surrounding the display portion DA. In the embodiments, the liquid crystal panel PNL is overlaid on the camera 1 in the third direction Z and, particularly, the display portion DA is overlaid on the camera 1. Descriptions of a detailed structure of the liquid crystal panel PNL are omitted here. However, the liquid crystal panel PNL may comprise any one of configurations corresponding to a display mode using a lateral electric field along the main surface of the substrate, a display mode using a longitudinal electric field along the normal of the main surface of the substrate, a display mode using an inclined electric field which is tilted obliquely with respect to the main surface of the substrate, and a display mode using an appropriate combination of the above lateral electric field, longitudinal electric field, and inclined electric field. The main surface of the substrate is a surface parallel to the X-Y plane.

The first polarizer PL1 and the second polarizer PL2 are overlaid on at least the display portion DA with respect to the liquid crystal panel PNL. In addition, the first polarizer PL1 and the second polarizer PL2 are overlaid on the camera 1 in the third direction Z.

The light guide LG has a first side surface SA opposed to the light sources EM, a second side surface SB on a side opposite to the first side surface SA, a main surface SC opposed to the liquid crystal panel PNL, a main surface SD on a side opposite to the main surface SC, and a first through hole TH1. The first through hole TH1 is located between the first side surface SA and the second side surface SB in the second direction Y and is closer to the second side surface SB than to the first side surface SA. The camera 1 is overlaid on the first through hole TH1 in the third direction Z.

A plurality of optical sheets OS are located between the light guide LG and the liquid crystal panel PNL and is opposed to the main surface SC. Each of the optical sheets OS has a second through hole TH2 overlaid on the first through hole TH1. The optical sheets OS are, for example, prism sheets or diffusion sheets.

The reflective sheet RS is opposed to the main surface SD. That is, the light guide LG is located between the reflective sheet RS and the optical sheets OS. The reflective sheet RS has a third through hole TH3 overlaid on the first through hole TH1. The third through hole TH3, the first through hole TH1, and the second through hole TH2 are arranged in this order in the third direction Z and are provided in line. For example, the reflective sheet RS may be fixed to a frame formed of a metal. In this case, a through hole overlaid on the first through hole TH1 may also be provided in the frame.

For example, the light sources EM are light-emitting diodes (LED), which emit white illumination light. The illumination light emitted from the light sources EM is made incident from the first side surface SA to travel in a direction of an arrow indicative of the second direction Y. Then, the illumination light guided by the light guide LG is emitted from the main surface SC toward the liquid crystal panel PNL to illuminate the liquid crystal panel PNL. The liquid crystal panel PNL, the first polarizer PL1, and the second polarizer PL2 display an image by allowing the illumination light to be selectively transmitted on the display portion DA.

FIG. 2 is a cross-sectional view including the display device DSP and a camera 1 shown in FIG. 1. The liquid crystal panel PNL comprises a first substrate SUB1, a second substrate SUB2, a liquid crystal layer LC, and a sealant SE. The sealant SE is located in the non-display portion NDA to bond the first substrate SUB1 and the second substrate SUB2 and to seal the liquid crystal layer LC.

Main parts of the first substrate SUB1 and the second substrate SUB2 will be simply described below. The first substrate SUB1 comprises a first insulating substrate 10 and an alignment film AL1. The second substrate SUB2 comprises a second insulating substrate 20, a color filter CF, a light-shielding layer BMA, a transparent layer OC, and an alignment film AL2.

The first insulating substrate 10 and the second insulating substrate 20 are transparent substrates such as glass substrates or flexible resin substrates. The alignment films AL1 and AL2 are in contact with the liquid crystal layer LC.

The color filter CF, the light-shielding layer BMA, and the transparent layer OC are located between the second insulating substrate 20 and the liquid crystal layer LC.

The light-shielding layer BMA is located in the non-display portion NDA. A boundary B between the display portion DA and the non-display portion NDA corresponds to an inner side edge of the light-shielding layer BMA. The sealant SE is provided at a position overlaid on the light-shielding layer BMA.

Details of the color filter CF are omitted here. For example, however, the color filter CF comprises color filters of respective red, green, and blue colors. The transparent layer OC covers the color filter CF and the light-shielding layer BMA. For example, the transparent layer OC is a transparent organic insulating film.

In the embodiments, the display portion DA has a region A1 where the color filter CF is arranged and a region A2 where the color filter CF is not arranged. The transparent layer OC is arranged over the region A1 and the region A2, is in contact with the color filter CF in the region A1, and is in contact with the second insulating substrate 20 in the region A2. When the relationship in position between the camera 1 and the display portion DA is focused, the camera 1 is overlaid on the region A2. That is, the color filter CF is not overlaid on the camera 1.

The first polarizer PL1 is bonded to the first insulating substrate 10. The second polarizer PL2 is bonded to the second insulating substrate 20. The first polarizer PL1 and the second polarizer PL2 are arranged over the region A1 and the region A2 and overlaid on the camera 1. Incidentally, the liquid crystal element LCD may comprise a retardation film, a scattering layer, an antireflective layer, and the like as needed.

For example, an ultra-birefringent film can be included in the second polarizer PL2 or the first polarizer PL1. It is known that the ultra-birefringent film makes the transmitted light non-polarized (change to natural light) when linearly polarized light is made incident, and a subject can be captured without uncomfortable feeling even if the subject includes an element which emits polarized light. For example, when the liquid crystal display device or the like is reflected in a subject of the camera 1, the luminance of the liquid crystal display device in the subject made incident on the camera 1 may be varied due to a relationship in the first polarizer PL1, second polarizer PL2, and angle between the polarizer and the liquid crystal display device which is the subject, and an uncomfortable feeling may be made at imaging, since the linearly polarized light is emitted from the liquid crystal display device. However, the variation in the luminance that causes the uncomfortable feeling can be suppressed by providing the ultra-birefringent film in the second polarizer PL2 or the first polarizer PL1.

As a film exhibiting the ultra-birefringence, for example, COSMOSHINE (registered trademark) manufactured by TOYOBO CO., LTD., is preferably used. The ultra-birefringence means in-plane retardation of higher than or equal to 800 nm to light in the visible range, for example, 550 nm.

The first through hole TH1, the second through hole TH2, and the third through hole TH3 are overlaid on each other to form a space SP opened to a lower part of the liquid crystal panel PNL. The camera 1 is provided in the space SP formed by the first through hole TH1 and the like. For example, the camera 1 comprises an optical system 2 including at least one lens, an image sensor (imaging device) 3, and a casing 4. The casing 4 accommodates the optical system 2 and the image sensor 3. The optical system 2 is located between the liquid crystal panel PNL and the image sensor 3, and the camera 1 can receive light via the liquid crystal panel PNL. The camera 1 is electrically connected to a wiring substrate F. Incidentally, the camera 1 does not need to be provided in the first through hole TH1 but may be provided outside the space SP. In any way, the camera 1 needs only to be provided at a position overlaid on the first through hole TH1 in the third direction Z. In the embodiments, the example of providing the camera 1 overlaid on the first through hole TH1 has been described. However, the imaging device receiving the light emitted through the first through hole TH1 and the optical system 2 and outputting an electric signal may be overlaid on the first through hole TH1.

According to the embodiments, the camera 1 is overlaid on the display portion DA of the liquid crystal panel PNL. For this reason, space to install the camera 1 in the non-display portion NDA does not need to be provided. Therefore, the frame width of the non-display portion NDA can be reduced as compared with a case where the camera 1 is overlaid on the non-display portion NDA or a case where the camera 1 is not overlaid on the display portion DA but the camera 1 and the liquid crystal panel PNL are arranged in the second direction Y.

In addition, since the camera 1 is not overlaid on the color filter CF, the light made incident on the camera 1 through the liquid crystal panel PNL is hardly influenced by the color filter CF. For this reason, undesired absorption and coloring by the color filter CF can be suppressed.

Incidentally, in the example illustrated in FIG. 2, the color filter CF is provided on the second substrate SUB2, but may be provided on the first substrate SUB1.

Figure 3:
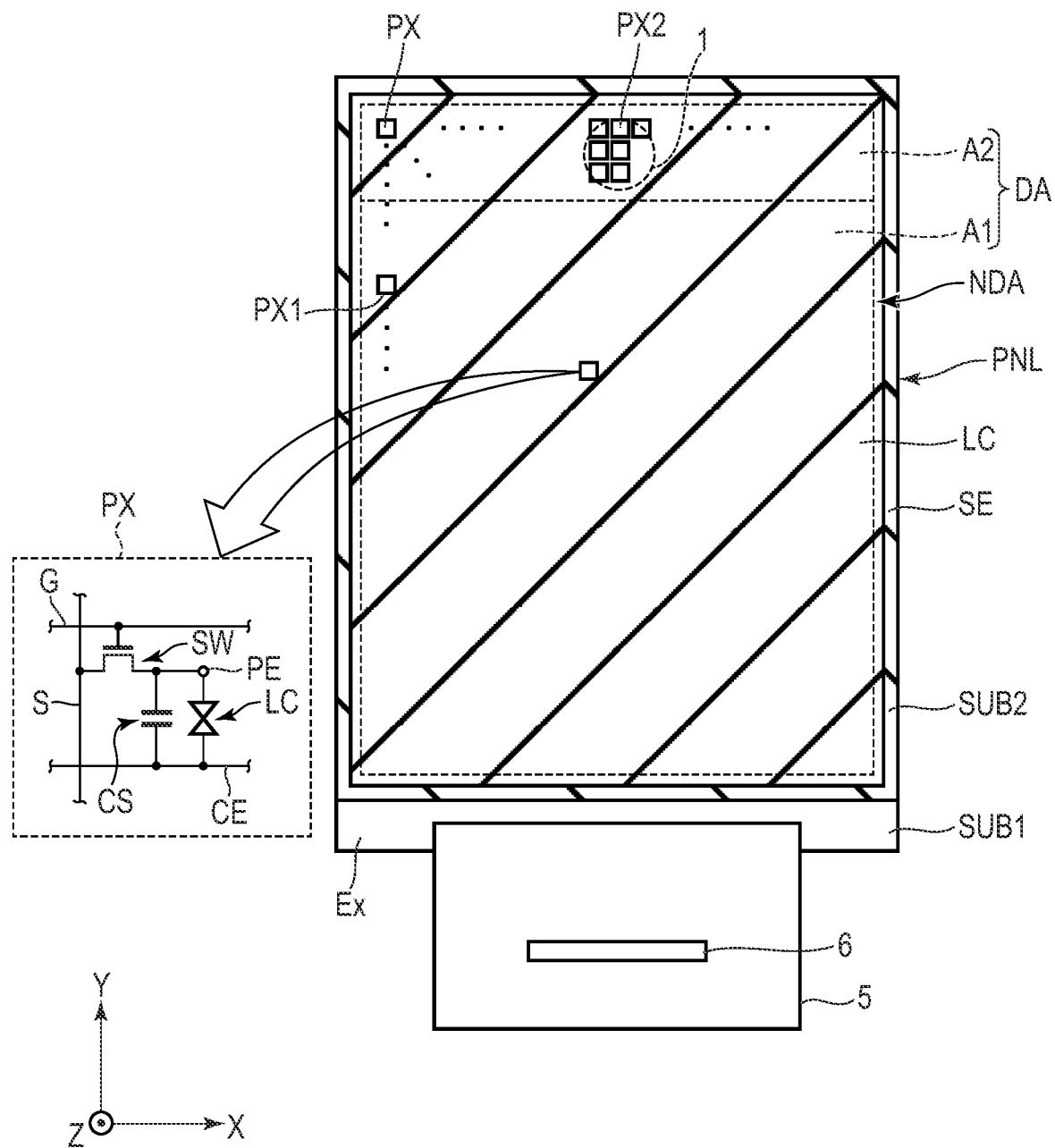
FIG. 3 is a plan view showing a configuration example of the liquid crystal panel PNL shown in FIG. 1.

FIG. 3 is a plan view showing a configuration example of the liquid crystal panel PNL shown in FIG. 1. In FIG. 3, the liquid crystal layer LC and the sealant SE are represented by different oblique lines. The display portion DA is a substantially quadrangular region that does not include a notch part and is located in an inner side surrounded by the sealant SE.

In the display portion DA, the region A1 and the region A2 are arranged in the second direction Y. As described with reference to FIG. 2, the region A1 is a region where the color filter CF is arranged, and the region A2 is a region where the color filter CF is not arranged. That is, the region A2 is a monochromatic display region and corresponds to a region where stepwise display from white (or transparent) display to black display can be performed. That is, in the region A2, halftone (gray) display can also be performed. In contrast, the region A1 corresponds to a region where color display can be performed. In the example illustrated in FIG. 3, the region A2 includes a region overlaid on the camera 1 and extends in the first direction X. Incidentally, the region A2 may be the only region overlaid on the camera 1. In this case, the region A1 is extended to a region around the camera 1.

The liquid crystal panel PNL comprises pixels PX arrayed in a matrix in the first direction X and the second direction Y, in the region A1 and the region A2 of the display portion DA. First pixels PX1 included in the region A1 are not overlaid on the camera 1. The region A2 includes second pixels PX2 overlaid on the camera 1. Each of the pixels PX in the display portion DA has the same circuit configuration.

Incidentally, in FIG. 3, an outer shape of the camera 1 is represented by a dashed line, representing a second pixel PX2 overlaid on the camera 1. Ideally, the second pixel PX2 is overlaid an optical system 2 including the lens of the camera 1, and may include a pixel PX overlaid on the casing 4 of the camera 1 in planar view, in the second pixel PX2.

As shown and enlarged in FIG. 3, each pixel PX comprises a switching element SW, a pixel electrode PE, a common electrode CE, a liquid crystal layer LC and the like. The switching element SW is constituted by, for example, a thin-film transistor (TFT) and is electrically connected to a scanning line G and a signal line S. The pixel electrode PE is electrically connected to the switching element SW. Each pixel electrode PE is opposed to the common electrode CE, and drives the liquid crystal layer LC by an electric field produced between the pixel electrode PE and the common electrode CE. A capacitor CS is formed, for example, between an electrode with the same potential as the common electrode CE and an electrode with the same potential as the pixel electrode PE.

A wiring substrate 5 is electrically connected to an extended part Ex of the first substrate SUB1. An IC chip 6 is electrically connected to the wiring substrate 5. Incidentally, the IC chip 6 may be electrically connected to the extended part Ex. The IC chip 6 incorporates, for example, a display driver which outputs a signal necessary for image display, and the like. The wiring substrate 5 may be a foldable flexible printed circuit.

Figure 4:
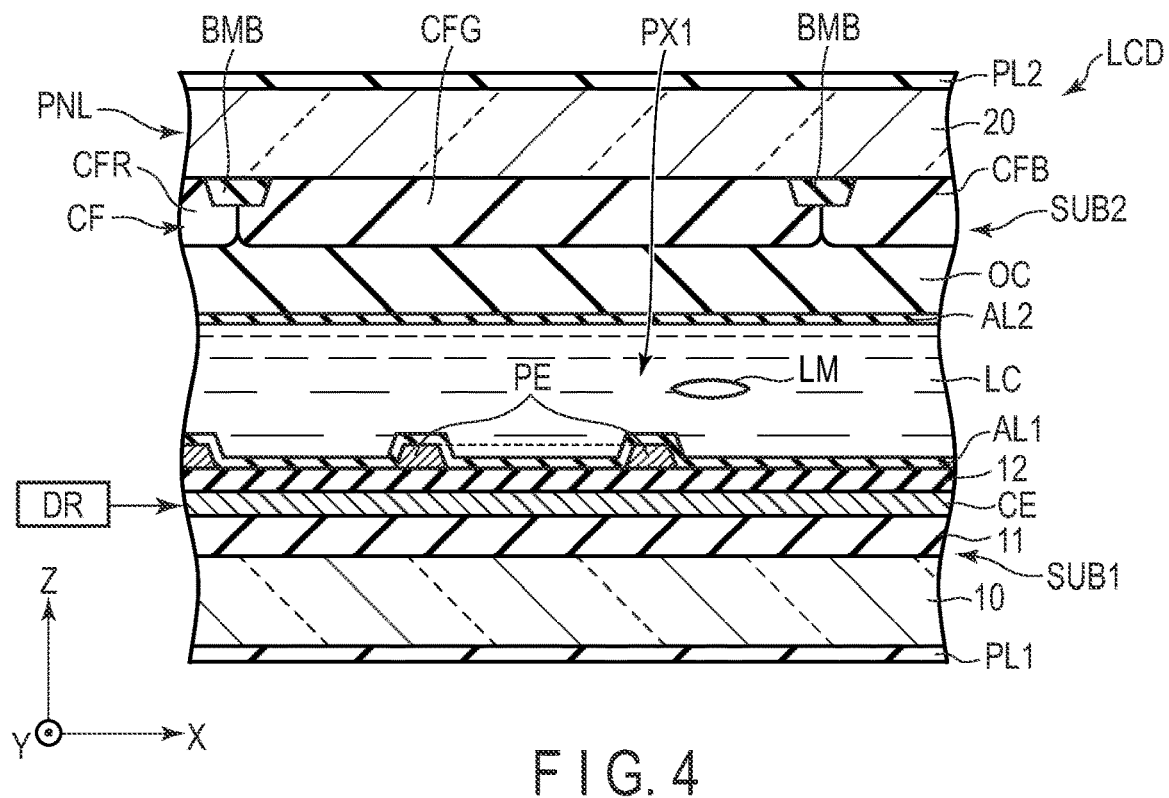
FIG. 4 is a cross-sectional view showing a liquid crystal element LCD including a first pixel PX1 shown in FIG. 3.

FIG. 4 is a cross-sectional view showing a liquid crystal element LCD including a first pixel PX1 shown in FIG. 3. The liquid crystal element LCD comprising the liquid crystal panel PNL corresponding to the display mode utilizing the lateral electric field between the first polarizer PL1 and the second polarizer PL2 will be described here.

The first substrate SUB1 comprises insulating films 11 and 12, a common electrode CE, and pixel electrodes PE between the first insulating substrate 10 and the alignment film AL1. Incidentally, for example, the scanning line G, the signal line S, and the switching element SW shown in FIG.

3 are located between the first insulating substrate 10 and the common electrode CE. The common electrode CE is located on the insulating film 11 and covered with the insulating film 12. The pixel electrodes PE are located on the insulating film 12 and covered with the alignment film AL1. The pixel electrodes PE are opposed to the common electrode CE through the insulating film 12. The common electrode CE and the pixel electrodes PE are formed of a transparent conductive material such as indium-tin-oxide (ITO) or indium-zinc-oxide (IZO). The insulating film 11 is not described in detail, but includes an inorganic insulating film and an organic insulating film. The insulating film 12 is, for example, an inorganic insulating film of a silicon nitride or the like.

In the second substrate SUB2, a light-shielding layer BMB is formed integrally with the light-shielding layer BMA of the non-display portion NDA described with reference to FIG. 2. The color filter CF includes a red colored filter CFR, a green colored filter CFG, and a blue colored filter CFB. The colored filter CFG is opposed to the pixel electrodes PE. The other colored filters CFR and CFB are also opposed to the other pixel electrodes PE (not shown).

A driver DR for driving the liquid crystal element LCD includes, for example, a scanning line drive circuit electrically connected to the scanning line G shown in FIG. 3, and a signal line drive circuit electrically connected to the signal line S.

The driver DR outputs a signal necessary for image display to each pixel PX of the display portion DA and controls the transmissivity of the liquid crystal element LCD. The transmissivity of the liquid crystal element LCD is controlled in accordance with the magnitude of the voltage applied to the liquid crystal layer LC.

For example, in the first pixel PX1, in an OFF state in which no voltage is applied to the liquid crystal layer LC, liquid crystal molecules LM contained in the liquid crystal layer LC are subjected to initial alignment in a predetermined direction between the alignment films AL1 and AL2. In such an OFF state, the light guided from the light sources EM shown in FIG. 1 to the first pixel PX1 is absorbed by the first polarizer PL1 and the second polarizer PL2. For this reason, the liquid crystal element LCD displays black, in the first pixel PX1 in the OFF state.

In contrast, in an ON state in which a voltage is applied to the liquid crystal layer LC, the liquid crystal molecules LM are aligned in a direction different from the initial alignment direction by the electric field formed between the pixel electrodes PE and the common electrode CE, and the alignment direction is controlled by the electric field. In such an ON state, part of the light guided to the first pixel PX1 is transmitted through the first polarizer PL1 and the second polarizer PL2. For this reason, the liquid crystal element LCD displays the color corresponding to the color layer CF, in the first pixel PX1 in the ON state.

The above example corresponds to so called a normally black mode of displaying a black color in the OFF state, but a normally white mode of displaying a black color in the ON state (i.e., displaying a white color in the OFF state) may be applied.

Figure 5:
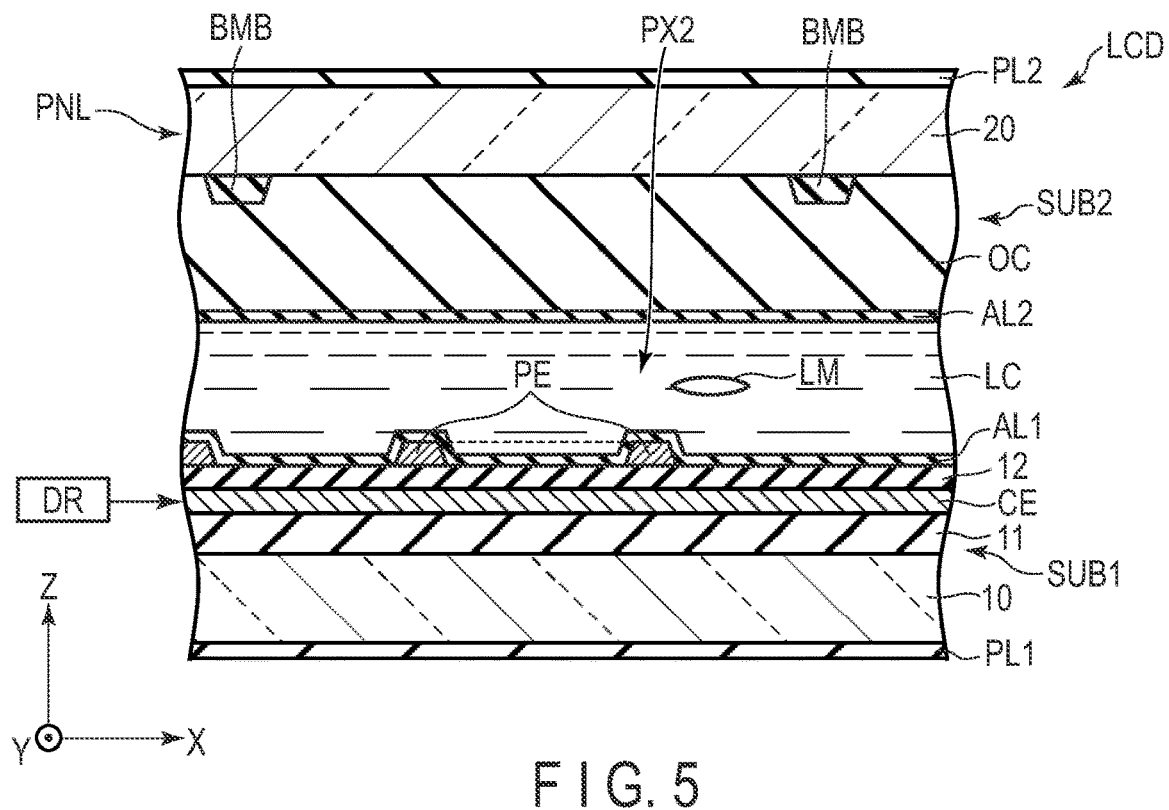
FIG. 5 is a cross-sectional view showing a liquid crystal element LCD including a second pixel PX2 shown in FIG. 3.

FIG. 5 is a cross-sectional view showing a liquid crystal element LCD including a second pixel PX2 shown in FIG. 3. The second pixel PX2 is different from the first pixel PX1 shown in FIG. 4 with respect to a feature that the second substrate SUB2 does not comprise the color filter CF. That is, the transparent layer OC is in contact with the second insulating substrate 20 directly above the pixel electrodes PE. Incidentally, a transparent resin layer may be provided between the transparent layer OC and the second insulating substrate 20 to adjust the thickness of the transparent layer OC.

The transmissivity of the liquid crystal element LCD in the second pixel PX2 is controlled by the driver DR, similarly to the first pixel PX1. That is, in the second pixel PX2 in the OFF state in which no voltage is applied to the liquid crystal layer LC, the liquid crystal element LCD has the minimum transmissivity and displays a black color, similarly to the first pixel PX1. That is, the liquid crystal element LCD exerts a light-shielding function in the pixel PX 2.

In contrast, in the ON state in which a voltage is applied to the liquid crystal layer LC, part of the light guided to the second pixel PX2 is transmitted through the first polarizer PL1 and the second polarizer PL2. The liquid crystal element LCD displays a white color or becomes transparent, with the maximum transmissivity, in the second pixel PX2 in the ON state. In addition, as described above, the liquid crystal element LCD may be controlled to have a middle transmissivity between the minimum transmissivity and the maximum transmissivity and may display a gray color. That is, the liquid crystal element LCD exerts a light transmitting function in the second pixel PX2.

In the embodiments, the light-shielding layers BMB are formed in the region A1 and the region A2. However, the width of the light-shielding layer BMB in the region A2 may be narrower than the width of the light-shielding layer BMB in the region A1. Furthermore, the light-shielding layer BMB may not be provided in the region A2. The width of the light-shielding layer BMB may be reduced or the light-shielding layer BMB may not be provided in the first direction X or the second direction Y or both the first direction X and the second direction Y.

Figure 6:
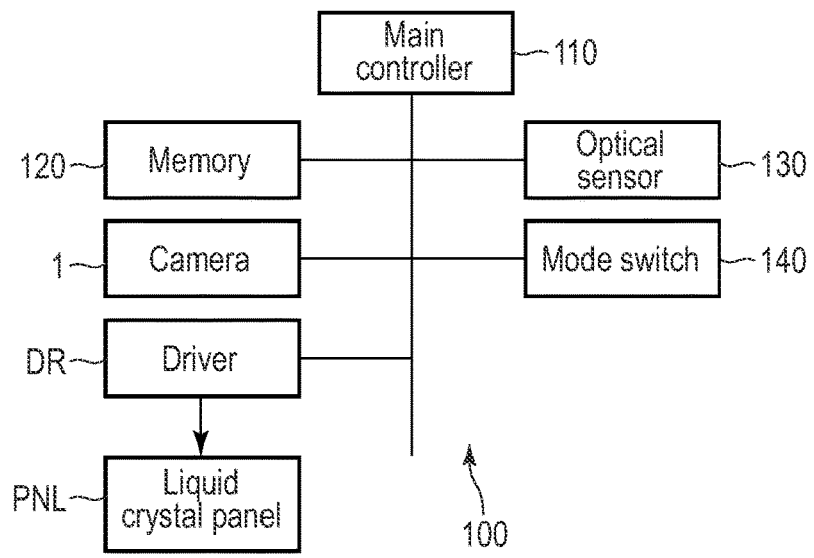
FIG. 6 is a block diagram showing a configuration example of controlling the liquid crystal panel PNL.

FIG. 6 is a block diagram showing a configuration example of controlling the liquid crystal panel PNL. The electronic apparatus 100 comprises a main controller 110, a memory 120, an optical sensor 130, and a mode switch 140 in addition to the camera 1 and the liquid crystal panel PNL. The memory 120 stores various data and various programs to control the electronic apparatus 100. The optical sensor 130 measures ambient brightness of the electronic apparatus 100 and outputs the measurement result to the main controller 110. The optical sensor 130 is composed of, for example, a photoreceiver such as a photodiode or a phototransistor. For example, the optical sensor 130 is an illuminometer which measures illumination as brightness. The mode switch 140 is a user interface operated by the user to accept input of settings in a desired mode. The main controller 110 implements various functions by a program stored in the memory 120. For example, the main controller 110 controls the driver DR of the liquid crystal panel PNL, based on the measurement result from the optical sensor 130 or input of the settings via the mode switch 140.

Figure 7:
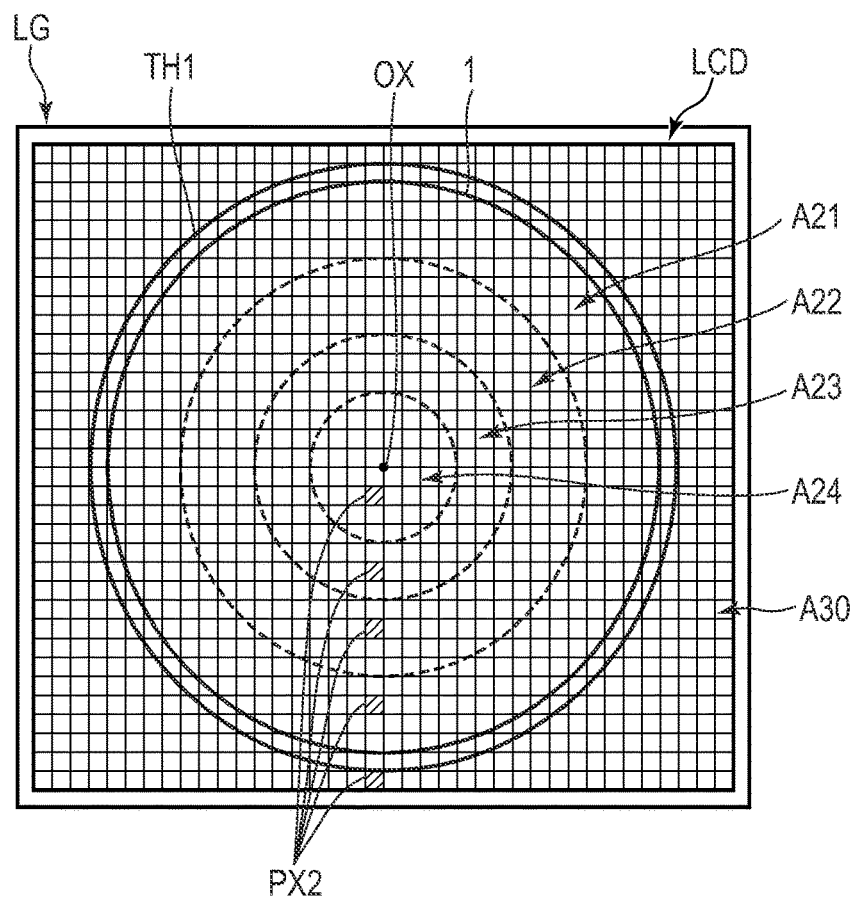
FIG. 7 is a plan view showing a configuration example of the liquid crystal element LCD overlaid on a camera 1.

FIG. 7 is a plan view showing a configuration example of the liquid crystal element LCD overlaid on a camera 1. The liquid crystal element LCD includes, for example, four regions A21 to A24 as regions overlaid on the camera 1. Each of the regions A21 to A23 is formed in an annular shape. The region A24 is formed in a substantially circular shape. The region A22 is adjacent to the inside of the region A21, the region A23 is adjacent to the inside of the region A22, and the region A24 is adjacent to the inside of the region A23. Four regions A21 to A24 are formed substantially isotropically about the optical axis OX of the camera 1. Incidentally, the liquid crystal element LCD may be divided into five or more regions or divided into three or less regions as the regions overlaid on the camera 1. In addition, a perfect circle is shown as the example of an annular shape. However, the shape may be a shape such as an ellipse other than a perfect circle. In addition, the regions A21 to A23 are not limited to the annular shape. The regions A21 to A24 may be a stripe shape or the like. For example, when capturing in the backlight is performed, correction can be performed to some extent by a camera or image processing, but the region A21 of the present invention can be made to correspond to a shape of a region of the largest backlight and the region A24 can be shaped in accordance with the shape of the subject.

In addition, the liquid crystal element LCD includes a region A30 surrounding the region A21 outside the camera 1. In these regions A21 to A24 and the region A30, the second pixels PX2 shown in FIG. 5 are arrayed in a matrix. In the configuration example shown in FIG. 7, for example, at least one of the regions A21 to A23 corresponds to the first region, at least one of the regions A22 to A24 inside the first region corresponds to the second region, and the region A30 corresponds to the third region.

As described with reference to FIG. 2, the camera 1 is provided in the first through hole TH1 of the light guide LG, and any one of four regions A21 to A24 is overlaid on the first through hole TH1. The region A30 is overlaid on the light guide LG.

Such a liquid crystal element LCD can function as an aperture for adjusting the quantity of the light made incident on the camera 1 by transmitting or blocking the light in each region. As the area of the region where the light is transmitted is smaller, the light beam made incident on the camera 1 is limited, an influence of the aberration in the optical system 2 can be reduced, the sharpness can be improved, and the depth of focus can be made larger. That is, the brightness, sharpness, depth of focus, and the like of a subject can be adjusted by adjusting the area of the region where the light is transmitted.

Figure 8:
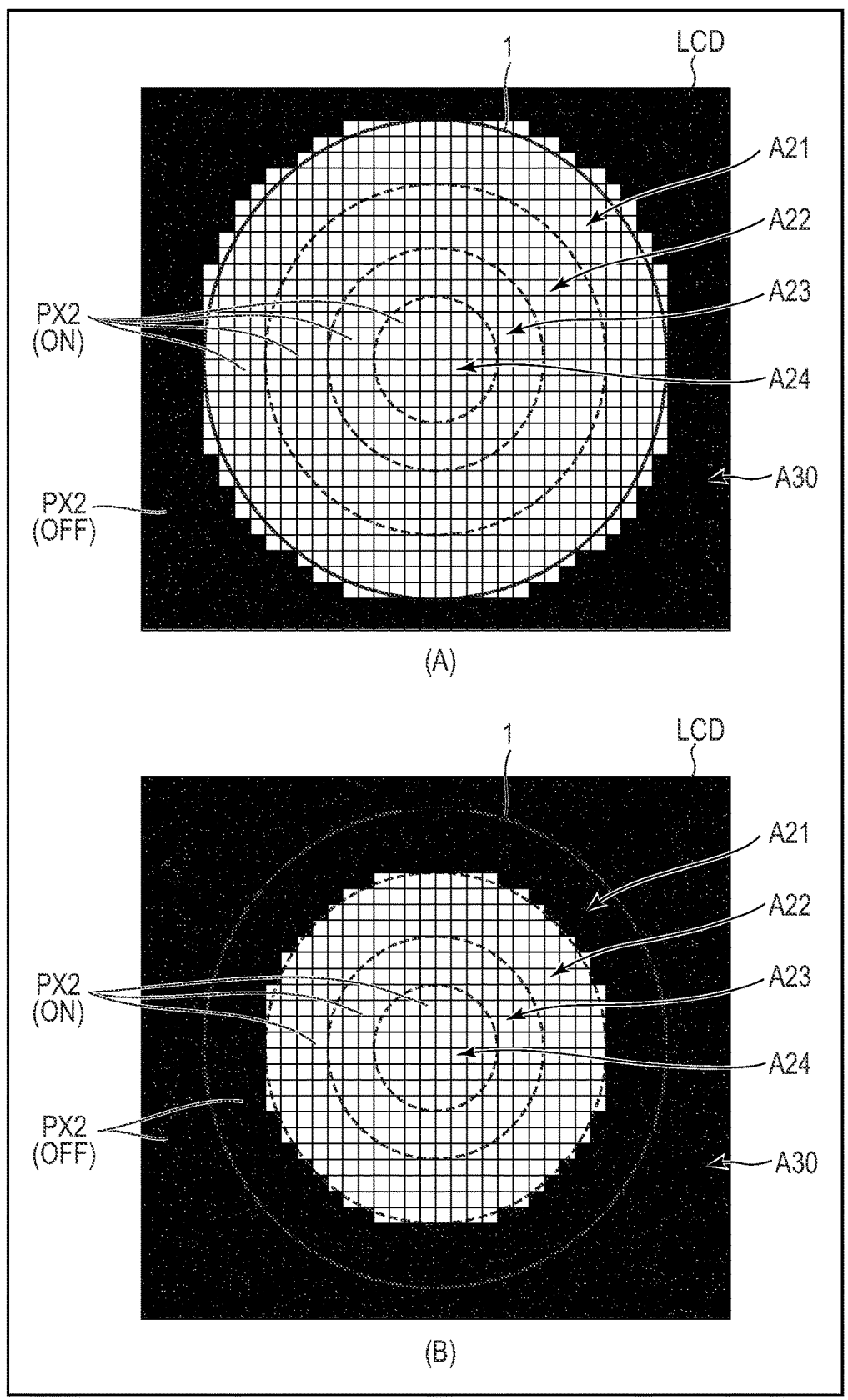
FIG. 8 is a plan view showing a control example of the liquid crystal element LCD shown in FIG. 7.

FIG. 8 is a plan view showing a control example of the liquid crystal element LCD shown in FIG. 7.

(A) of FIG. 8 is a diagram for illustration of a first opening mode. The liquid crystal element LCD in the first opening mode transmits light through the regions A21 to A24. For example, each of the second pixels PX2 in the regions A21 to A24 is in the ON state described with reference to FIG. 5. However, the transmissivity in the second pixel PX2 does not need to be the maximum transmissivity and may be a middle transmissivity. Therefore, when the liquid crystal element LCD is set to the first opening mode, the light transmitted through the regions A21 to A24 is received by the camera 1.

In the example illustrated, the second pixels PX2 in a region A30 are in the OFF state and the liquid crystal element LCD blocks the light in the region A30. However, the liquid crystal element LCD may transmit the light through the region A30. In the figure, the second pixels PX2 where the light is transmitted are represented in white and the second pixels PX2 where the light is block are represented in gray.

(B) of FIG. 8 is a diagram for illustration of a second opening mode. The liquid crystal element LCD in the second opening mode blocks the light in the region A21 and transmits light through the regions A22 to A24. The second pixels PX2 of the region A21 are in the OFF state, and the second pixels PX2 in each of the regions A22 to A24 are in the ON state. In addition, the second pixels PX2 in the region A30 are also in the OFF state and the light is blocked in the region A30. Therefore, when the liquid crystal element LCD is set to the second opening mode, the light transmitted through the regions A22 to A24 is received by the camera 1.

When the first opening mode and the second opening mode are compared, the total number of second pixels PX2 transmitting the light, of the second pixels PX2 overlaid on the camera 1, is smaller in the second opening mode than that in the first opening mode. In addition, the total area of the regions where the light is transmitted, of the regions overlaid on the camera 1, is smaller in the second opening mode than that in the first opening mode.

Incidentally, blocking the light in the region A21 in the second opening mode has been described. However, the quantity of light transmitted through the region A21 needs only to be smaller than the quantity of light transmitted through the regions A22 to A24. In other words, the transmissivity of the region A21 needs only to be set to be lower than the transmissivity of the regions A22 to A24.

FIG. 9 is a plan view showing another control example of the liquid crystal element LCD shown in FIG. 7.

(A) of FIG. 9 is a diagram for illustration of a third opening mode. The liquid crystal element LCD in the third opening mode blocks the light in the regions A21 and A22 and transmits light through the regions A23 to A24. (B) of FIG. 9 is a diagram for illustration of a fourth opening mode. The liquid crystal element LCD in the fourth opening mode blocks the light in the regions A21 to A23 and transmits light through the region A24.

FIG. 10 is a flowchart illustrating the control example of the liquid crystal element LCD of the embodiments. A control example in which the main controller 110 shown in FIG. 6 controls the above-described first to fourth opening modes based on the measurement result of the optical sensor 130 when capturing with the camera 1 is performed will be described.

The main controller 110 determines whether the luminance of the external light is level 1 or lower or not, based on the measurement result of the optical sensor 130 (step ST1). When determining that the external light is level 1 or lower (ST1, YES), the main controller 110 controls the driver DR to implement the first opening mode shown in (A) of FIG. 8 (step ST2). The liquid crystal panel PNL is driven by the driver DR, and the liquid crystal element LCD transmits light through the regions A21 to A24. For this reason, more light can be taken in the camera 1 even at a dark place where the luminance is determined to be level 1 or lower.

When determining that the external light is higher than level 1 (ST1, NO), the main controller 110 determines whether the luminance is level 2 or lower or not (step ST3). Similarly, when determining that the external light is level 2 or lower (ST3, YES), the main controller 110 controls to implement the second opening mode shown in (B) of FIG. 8 (step ST4). In addition, when determining that the external light is level 3 or lower (ST5, YES), the main controller 110 controls to implement the third opening mode shown in (A) of FIG. 9 (step ST6). When determining that the external light is higher than level 3 (ST5, NO), the main controller 110 controls to implement the fourth opening mode shown in (B) of FIG. 9 (step ST7). Thus, the quantity of light taken in the camera 1 can be arbitrarily adjusted in accordance with the luminance at a bright place where the luminance is determined to be higher than level 1.

Thus, according to the embodiments, the quantity of light taken in the camera 1 can be adjusted in accordance with the ambient luminance and sharp pictures can be captured at a bright place or a dark place, by the liquid crystal element LCD overlaid on the camera 1.

Incidentally, the example of controlling the opening mode based on the measurement result of the optical sensor 130 has been described in FIG. 10. However, the opening mode may be controlled based on the user's input of settings via the mode switch 140.

FIG. 11 is a plan view showing another configuration example of the liquid crystal element LCD overlaid on the camera 1. The liquid crystal element LCD comprises, for example, three electrodes 51 to 53 in the regions overlaid on the camera 1. Each of the electrodes 51 to 53 is a transparent electrode formed in an annular shape. The electrode 52 is adjacent to the inside of the electrode 51, the electrode 53 is adjacent to the inside of the electrode 52, and the region A50 inside the electrode 53 is formed in a substantially circular shape. Three electrodes 51 to 53 are formed substantially isotropically about the optical axis OX of the camera 1. Incidentally, the liquid crystal element LCD may comprise four or more transparent electrodes or two or less transparent electrodes in the regions overlaid on the camera 1. Each of the electrodes 51 to 53 and the region A50 is overlaid on the first through hole TH1.

Incidentally, FIG. 11 shows only three electrodes 51 to 53. However, pixels similar to the pixel PX shown in FIG. 3 are formed in regions other than the electrodes 51 to 53 (pixels other than the electrodes 51 to 53 are referred to as pixels PX). In addition, in the case of FIG. 11, the pixels PX included in the region A2 shown in FIG. 3 other than the electrodes 51 to 53 may be pixels capable of color display.

Figure 12:
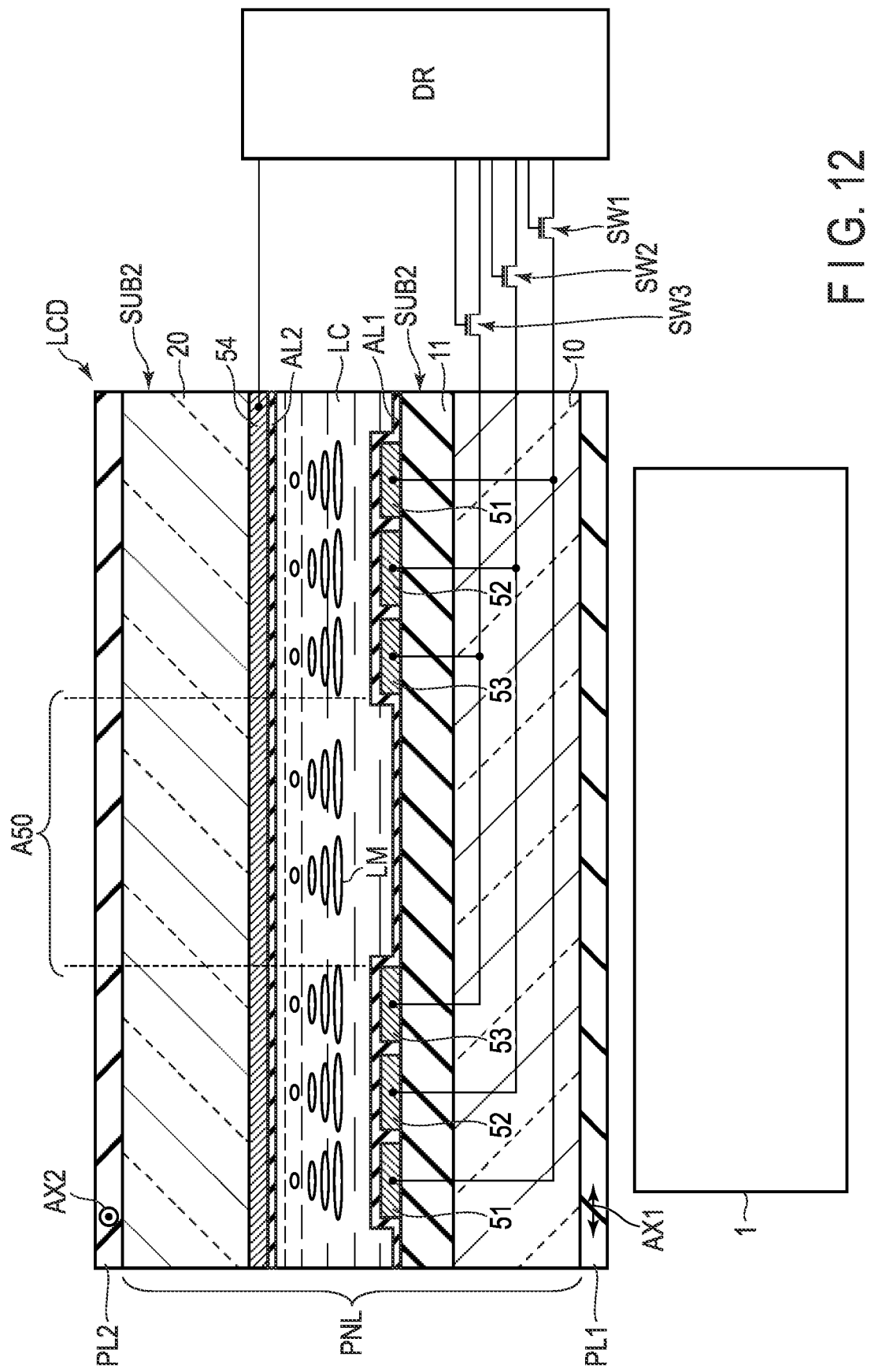
FIG. 12 is a cross-sectional view of the liquid crystal element LCD shown in FIG. 11.

FIG. 12 is a cross-sectional view of the liquid crystal element LCD shown in FIG. 11. The first substrate SUB1 comprises the electrodes 51 to 53 between the first insulating substrate 10 and the alignment film AL1. Each of the electrodes 51 to 53 is electrically connected to the driver DR via switching elements SW1 to SW3. The second substrate SUB2 comprises the electrode 54 between the second insulating substrate 20 and the alignment film AL2. The electrode 54 is a transparent electrode and is opposed to each of the electrodes 51 to 53. The electrode 54 is electrically connected to the driver DR. The liquid crystal layer LC located between alignment films AL1 and AL2 comprises twist-aligned liquid crystal molecules LM in the OFF state in which no voltage is applied. A state in which the driver DR applies an electric potential different from the electrode 54 to each of the electrodes 51 to 53 via the switching elements SW1 to SW corresponds to the ON state in which a voltage is applied to the liquid crystal layer LC. The liquid crystal molecules LM are aligned substantially perpendicularity to the first substrate SUB1 and the second substrate SUB2, in the ON state.

A polarization axis AX1 of the first polarizer PL1 and a polarization axis of the second polarizer PL2 are orthogonal to each other.

Such a liquid crystal element LCD transmits light in the OFF state in which the voltage is not applied to the liquid crystal layer LC and blocks light in the ON state in which the voltage is applied to the liquid crystal layer LC. In addition, the liquid crystal element LCD transmits light through the region A50 since the voltage is not applied to the liquid crystal layer LC.

The electrodes 51 to 53 are larger than the transparent electrodes (pixel electrodes) of the pixels PX (ratio in area:several to tens of times). For this reason, when the switching elements SW1 to SW3 are connected to the lines (i.e., the scanning line G and the signal line S shown in FIG. 3, etc.) which supply signals to the pixels PX, a difference in load on the driver DR (capacitance of the signal line) is made between the signal lines connected to the electrodes 51 to 53 and the signal lines which are not connected to the electrodes 51 to 53, of the signal lines connected to the driver DR. When the difference is made in the capacitance of the signal lines, inconvenience such as damage on uniformity of the display occurs. Thus, the inconvenience occurring due to the difference in capacitance of the signal lines can be avoided by forming lines connected to the switching elements SW1 to SW3 in an outer peripheral area of the display region other than the signals which supply the signals to the pixels PX, as shown in FIG. 12.

In addition, the switching elements SW1 to SW3 are formed in the non-display portion NDA outside the display portion DA as shown in FIG. 12 so as not to block the light incident on the camera 1. Incidentally, the switching elements SW1 to SW3 can be formed not in the non-display portion NDA, but at positions overlaid on the camera 1 or at the display portion DA. To reduce the blocked light, however, the switching elements SW1 to SW3 are formed at a lower density than the switching elements SW formed in the pixels PX. Incidentally, since the electrodes 51 to 53 are larger than the pixel electrodes of the pixels PX, the switching elements SW1 to SW3 may be formed to be larger (longer in channel width) than the switching elements SW.

Figure 13:
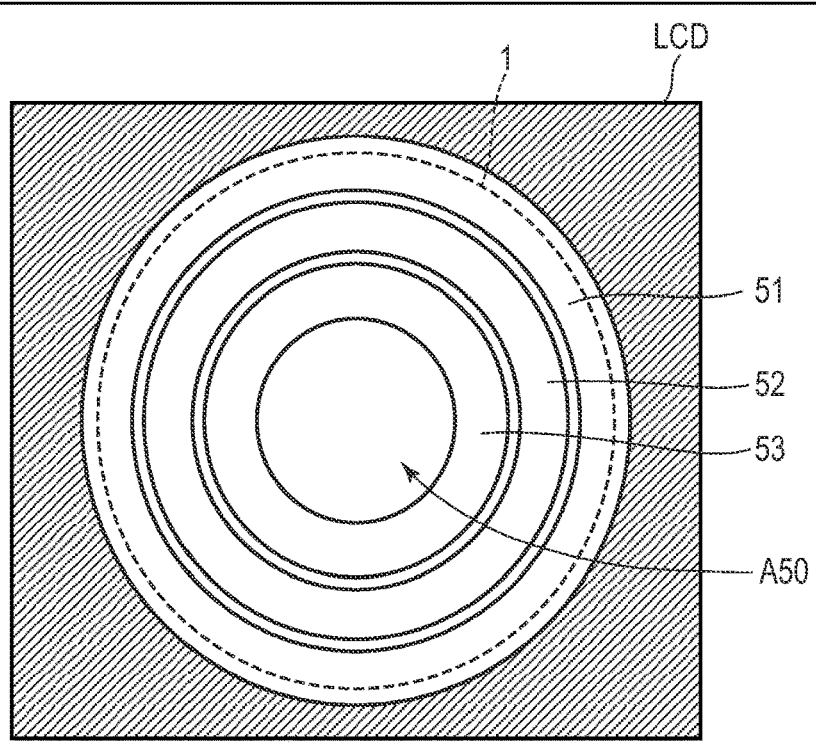
FIG. 13 is a plan view showing a control example of the liquid crystal element LCD shown in FIG. 11.
Figure 13:
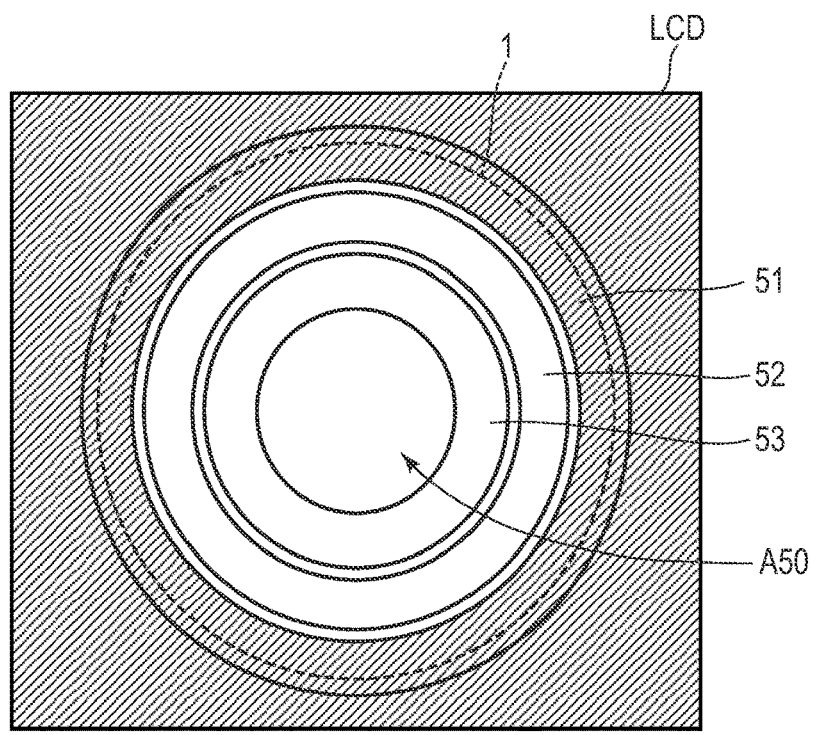

FIG. 13 is a plan view showing a control example of the liquid crystal element LCD shown in FIG. 11.

(A) of FIG. 13 is a diagram for illustration of a first opening mode. The liquid crystal element LCD in the first opening mode transmits light through the regions overlaid on the electrodes 51 to 53 and the region A50. For example, the voltage is not applied to the liquid crystal layer LC shown in FIG. 12 in the regions overlaid on the electrodes 51 to 53 and the region A50. Therefore, when the liquid crystal element LCD is set to the first opening mode, the light transmitted through the electrodes 51 to 53 and the region A50 is received by the camera 1.

(B) of FIG. 13 is a diagram for illustration of a second opening mode. The liquid crystal element LCD in the second opening mode blocks the light in the region overlaid on the electrode 51 and transmits light through the regions overlaid on the electrodes 52 and 53 and the region A50. In the region overlaid on the electrode 51, the voltage is applied to the liquid crystal layer LC. Therefore, when the liquid crystal element LCD is set to the second opening mode, the light transmitted through the electrodes 52 and 53 and the region A50 is received by the camera 1.

FIG. 14 is a plan view showing another control example of the liquid crystal element LCD shown in FIG. 11.

(A) of FIG. 14 is a diagram for illustration of a third opening mode. The liquid crystal element LCD in the third opening mode blocks the light in the regions overlaid on the electrodes 51 and 52 and transmits light through the region overlaid on the electrode 53 and the region 50. (B) of FIG. 14 is a diagram for illustration of a fourth opening mode. The liquid crystal element LCD in the fourth opening mode blocks light in the regions overlaid on the electrodes 51 to 53 and transmits light through the region A50.

The control example described with reference to FIG. 10 can also be applied to such a configuration example. In addition, the opening mode may be controlled based on the user's input of settings via the mode switch 140. Therefore, the same advantages as those of the above configuration example can be obtained.

Figure 15:
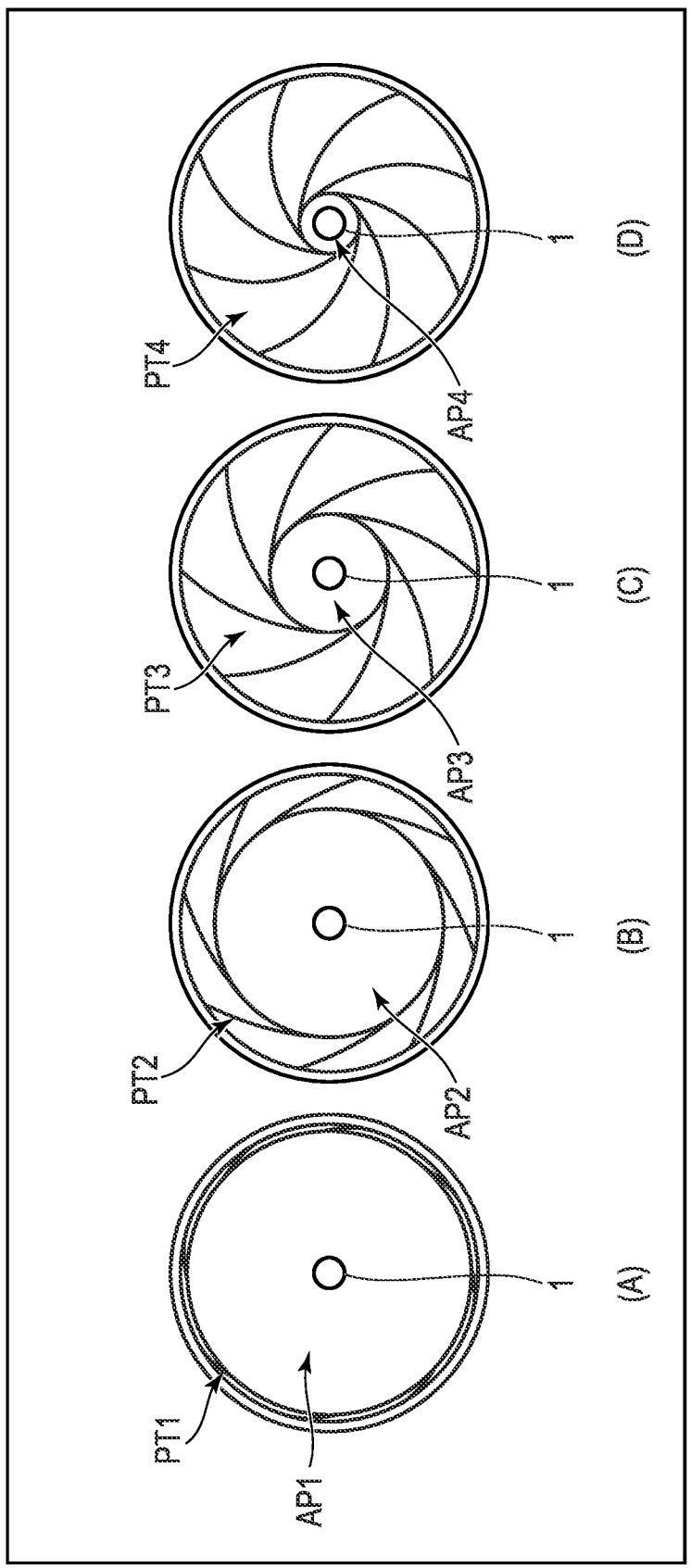
FIG. 15 is a diagram showing display examples of patterns displayed outside the camera 1 in the liquid crystal element LCD of the embodiments.

FIG. 15 is a diagram showing display examples of patterns displayed outside the camera 1 in the liquid crystal element LCD of the embodiments. Various patterns described here are displayed in, for example, the region A30 shown in FIG. 7.

(A) of FIG. 15 shows a first pattern PT1 displayed to correspond to the first opening mode. (B) of FIG. 15 shows a second pattern PT2 displayed to correspond to the second opening mode. (C) of FIG. 15 shows a third pattern PT3 displayed to correspond to the third opening mode. (D) of FIG. 15 shows a fourth pattern PT4 displayed to correspond to the fourth opening mode. Each of the first to fourth patterns PT1 to PT4 is an annular pattern. In the example illustrated, each of the first to fourth patterns PT1 to PT4 is displayed by a plurality of blades surrounding the camera 1. However, the pattern is not limited to this, but may be displayed by an annular pattern of a simple doughnut, a spiral annular pattern, or the other pattern.

Opening patterns AP1 to AP4 are displayed inside the first to fourth patterns PT1 to PT4, respectively. The opening patterns AP1 to AP4 may be displayed as circular patterns or polygonal patterns. The area of the opening pattern AP2 is smaller than the area of the opening pattern AP1. The area of the opening pattern AP3 is smaller than the area of the opening pattern AP2. The area of the opening pattern AP4 is smaller than the area of the opening pattern AP3.

The first pattern PT1 is displayed as gradation different on its inside and outside. For example, the first pattern PT1 is displayed in black or gray. The outside of the first pattern PT1 is displayed in white. The opening pattern AP1 inside the first pattern PT1 is displayed in white. The other second to fourth patterns PT2 to PT4 are also displayed in the same manner as the first pattern PT1.

Incidentally, four annular patterns are shown in the figure. However, the patterns are not limited to the mode of displaying these four annular patterns in stages, but a display mode of sequentially varying the area of the opening pattern may be applied.

FIG. 16 is a flowchart illustrating the control example of the liquid crystal element LCD of the embodiments.

When determining that the external light is level 1 or lower based on the measurement result of the optical sensor 130 (ST11, YES), the main controller 110 controls to implement the first opening mode shown in (A) of FIG. 8 (step ST12) and controls to display the first pattern PT1 and the opening pattern AP1 shown in (A) of FIG. 15 (step ST13).

When determining that the external light is level 2 or lower (ST14, YES), the main controller 110 controls to implement the second opening mode shown in (B) of FIG. 8 (step ST15) and controls to display the second pattern PT2 and the opening pattern AP2 shown in (B) of FIG. 15 (step ST16).

When determining that the external light is level 3 or lower (ST17, YES), the main controller 110 controls to implement the third opening mode shown in (A) of FIG. 9 (step ST18) and controls to display the third pattern PT3 and the opening pattern AP3 shown in (C) of FIG. 15 (step ST19).

When determining that the external light is higher than level 3 (ST17, NO), the main controller 110 controls to implement the fourth opening mode shown in (B) of FIG. 9 (step ST20) and controls to display the fourth pattern PT4 and the opening pattern AP4 shown in (D) of FIG. 15 (step ST21).

According to the embodiments, it is possible to visually notify the user of the set opening mode when the opening mode is automatically controlled based on the luminance measured by the optical sensor 130. In particular, in the electronic apparatus 100 in which the small camera 1 is mounted, the area of the liquid crystal element LCD overlaid on the camera 1 is small and the set opening mode may hardly be visually recognized directly. In this case, the user can easily recognize the opening mode by displaying the pattern corresponding to the opening mode outside a region overlaid on the camera 1.

In addition, even when the user selects the opening mode via the mode switch 140, the same advantages can be obtained by displaying the pattern corresponding to the opening mode.

Figure 17:
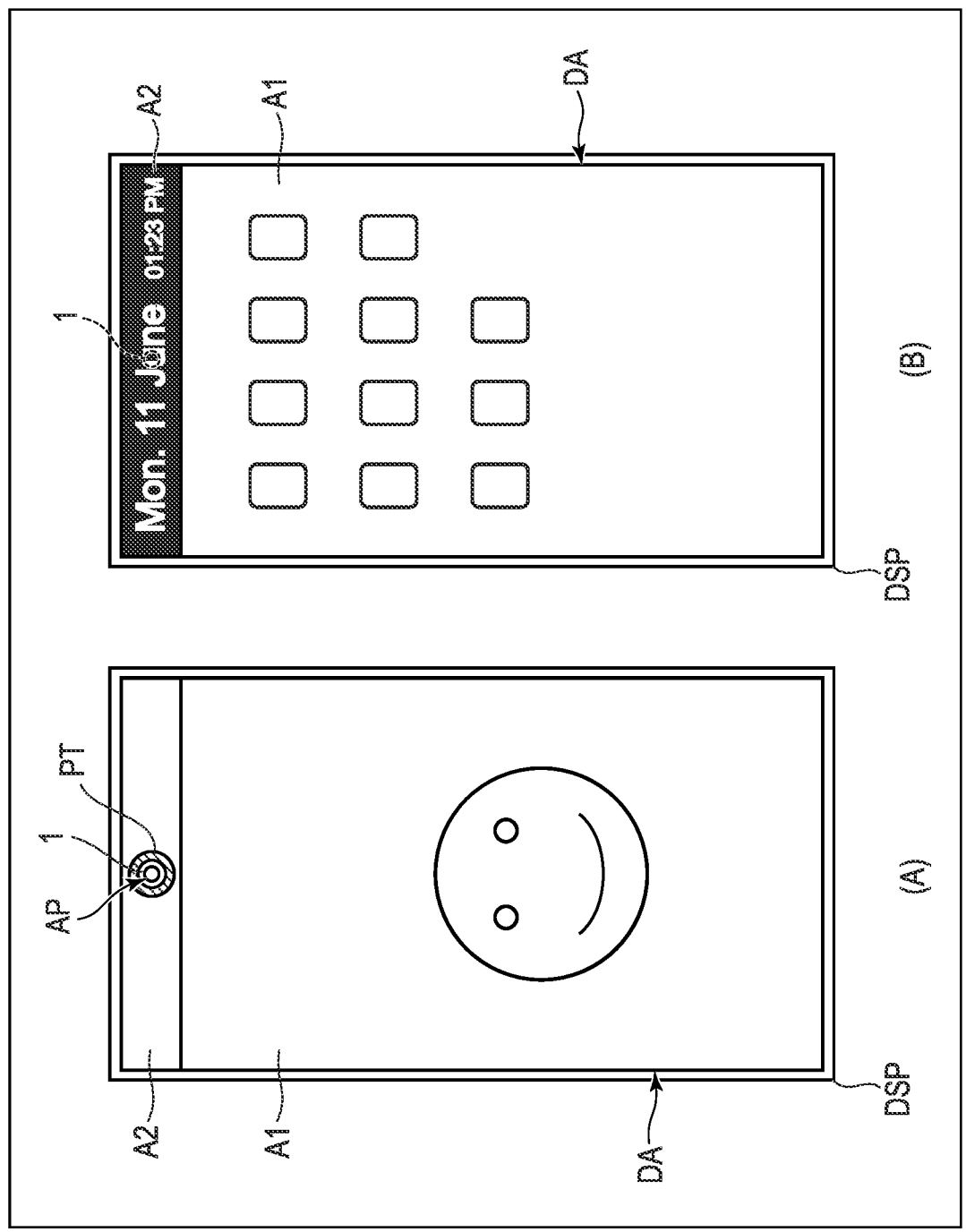
FIG. 17 is a diagram showing a display example of the display device DSP according to the embodiments.

FIG. 17 is a diagram showing a display example of the display device DSP according to the embodiments. (A) of FIG. 17 corresponds to a display example in the capturing mode of capturing with the camera 1. The capturing mode is, for example, a mode in which the user of the electronic apparatus 100 captures himself/herself as a subject. In the region A2 of the display portion DA, a region overlaid on the camera 1 is set to, for example, any one of the opening modes shown in FIG. 8 and FIG. 9, an annular pattern PT corresponding to the opening mode is displayed outside the camera 1, and the opening pattern AP is displayed inside the annular pattern PT. The annular pattern PT is subjected to, for example, monochromatic display. In contrast, the subject captured by the camera 1 is displayed in the region A1 of the display portion DA.

(B) of FIG. 17 corresponds to a display example in a case where the camera 1 is not used. Characters such as numbers, letters, symbols, and marks are displayed as monochromatic display in the region A2. In addition, the characters can also be displayed at positions overlaid on the camera 1. In the region A1, still images, moving images and the like are displayed as color display besides the home screen as shown in the drawing.

In addition, in the above embodiments, the example of using white light-emitting diodes (LED) as the light sources EM has been described. However, light-emitting diodes (LED) of different colors such as red, blue and green colors may be arranged and used. In addition, in this case, so called a field sequential system of sequentially making the light-emitting diodes (LED) of the respective colors illuminate, sequentially changing the respective color display, and thereby implementing color display, can also be employed. Thus, the color display can be implemented in both the region A1 and the region A2 of the display portion DA without arranging the color filter CF in both the regions. In addition, the color filter CF may be arranged in the region A1 while the color filter CF may not be arranged in the region A2, and the color display may be implemented by employing the field sequential system in the region A2. For this reason, an annular pattern PT can be subjected to color display without arranging the color filter CF in the region A2.

As described above, according to the embodiments, a display device with a frame capable of being narrowed, an electronic apparatus incorporating the display device, and a program can be provided. In addition, an electronic apparatus capable of capturing sharp pictures can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a camera;
a liquid crystal element including a first region and a second region that are overlaid on the camera;
a memory storing a program for controlling opening of the liquid crystal element;
a driver driving the liquid crystal element; and
a controller controlling the memory and the driver, wherein
the program includes a first opening mode of transmitting light through the first region and the second region, and a second opening mode of making a quantity of the light transmitted through the first region smaller than a quantity of the light transmitted through the second region,
the program causes an annular first pattern to be displayed in a third region surrounding the first region outside the camera, in the first opening mode,
the program causes an annular second pattern to be displayed in the third region, in the second opening mode, and
a first area of an opening pattern displayed inside the second pattern is smaller than a second area of an opening pattern displayed inside the first pattern.

* * * * *